United States Patent [19]

Chung

[11] Patent Number: 5,857,075
[45] Date of Patent: Jan. 5, 1999

[54] METHOD AND INTEGRATED CIRCUIT FOR HIGH-BANDWIDTH NETWORK SERVER INTERFACING TO A LOCAL AREA NETWORK

[75] Inventor: David H. Chung, Sunnyvale, Calif.

[73] Assignees: Sony Corporation, Tokyo, Japan; Sony Electronics, Inc., Park Ridge, N.J.

[21] Appl. No.: 371,499

[22] Filed: Jan. 11, 1995

[51] Int. Cl.$^6$ ..................................................... G06F 13/00
[52] U.S. Cl. ................................. 395/200.53; 395/200.75
[58] Field of Search .................. 395/800, 200.8, 395/200.75, 200.53, 77

[56] References Cited

U.S. PATENT DOCUMENTS

| | | | |
|---|---|---|---|
| H586 | 2/1989 | Kun | 370/94 |
| Re. 33,426 | 11/1990 | Sugimoto | 370/84.14 |
| 4,213,201 | 7/1980 | Gagnier et al. | 370/62 |
| 4,589,120 | 5/1986 | Mendala | 375/117 |
| 4,597,078 | 6/1986 | Kempf | 370/94 |
| 4,627,052 | 12/1986 | Hoare et al. | 370/88 |
| 4,706,081 | 11/1987 | Hart et al. | 340/825.03 |
| 4,707,827 | 11/1987 | Bione et al. | 370/85 |
| 4,715,030 | 12/1987 | Koch et al. | 370/85 |
| 4,718,060 | 1/1988 | Oguchi et al. | 370/85 |
| 4,723,311 | 2/1988 | Moustakas et al. | 455/612 |
| 4,727,537 | 2/1988 | Nichols | 370/85 |
| 4,727,538 | 2/1988 | Furchtgott et al. | 370/85 |
| 4,737,953 | 4/1988 | Koch et al. | 370/94 |
| 4,744,078 | 5/1988 | Kowalczyk | 370/85 |
| 4,797,879 | 1/1989 | Habbab | 370/3 |
| 4,823,338 | 4/1989 | Chan et al. | 370/85 |
| 4,849,962 | 7/1989 | Morimoto et al. | 370/29 |

(List continued on next page.)

FOREIGN PATENT DOCUMENTS 0 642 246 A2  3/1995  European Pat. Off. ........ H04L 29/06

OTHER PUBLICATIONS

National Semiconductor, databook, "Sonic–T" pp. 1–457 to 1–556.

William Stallings, "Internetworking: A Guide for the Perplexed," Telecommunications, North American Edition, Sep. 1989, pp. 25–30.

Bob Stewart and Bill Hawe, "Local Area Network Applications," Telecommunications, North American Edition, Sep. 1984, pp. 96f–96j, and 96u.

Bob Stewart, Bill Hawe, and Alan Kirby, "Local Area Network Connection," Telecommunications, North American Edition, Sep. 1994, pp. 54–55, 58–59 and 66.

*Primary Examiner*—Eric Coleman
*Attorney, Agent, or Firm*—Haverstock & Associates

[57] ABSTRACT

A single-chip, network interface controller (NIC) integrated circuit (IC) with a host interface and arbiter common to two 10BASE-T ETHERNET local area network (LAN) segments with respective unshielded twisted pair interfaces, encoder-decoders, medium access controllers, first-in first-out register memory arrays, and buffer management. Source-address and destination-address content addressable memories are connected to respective MAC receivers in the medium access controllers to both learn the addresses of network clients on the two segments and then to transparently bridge packets between the LAN segments. The NIC effectively increases the bandwidth of a server connection to the thus unified network.

6 Claims, 7 Drawing Sheets

U.S. PATENT DOCUMENTS

| | | | |
|---|---|---|---|
| 4,878,216 | 10/1989 | Yunoki | 370/60 |
| 4,901,308 | 2/1990 | Deschaine | 370/58.1 |
| 4,905,219 | 2/1990 | Barr et al. | 370/4 |
| 4,933,937 | 6/1990 | Konishi | 370/85.13 |
| 4,935,922 | 6/1990 | Wicklund et al. | 370/60 |
| 5,016,159 | 5/1991 | Maruyama | 364/200 |
| 5,020,052 | 5/1991 | DePrycker et al. | 370/60 |
| 5,048,014 | 9/1991 | Fischer | 370/85.5 |
| 5,107,489 | 4/1992 | Brown et al. | 370/58.2 |
| 5,119,367 | 6/1992 | Kawakatsu et al. | 370/54 |
| 5,140,585 | 8/1992 | Tomikawa | 370/60.1 |
| 5,151,897 | 9/1992 | Suzuki | 370/85.13 |
| 5,166,926 | 11/1992 | Cisneros et al. | 370/60 |
| 5,184,346 | 2/1993 | Kozaki et al. | 370/60 |
| 5,241,550 | 8/1993 | Kusano | 371/71 |
| 5,243,699 | 9/1993 | Nickolls et al. | 395/275 |
| 5,274,631 | 12/1993 | Bhardwaj | 370/60 |
| 5,379,289 | 1/1995 | De Souza | 370/85.13 |
| 5,379,296 | 1/1995 | Johnson | 370/60 |
| 5,386,413 | 1/1995 | McAuley et al. | 370/54 |
| 5,430,762 | 7/1995 | Vijeh et al. | 375/211 |
| 5,434,861 | 7/1995 | Pritty et al. | 370/85.8 |
| 5,446,726 | 8/1995 | Rostoker et al. | 370/17 |
| 5,457,679 | 10/1995 | Eng et al. | 370/16 |
| 5,521,913 | 5/1996 | Gridley | 370/58.2 |
| 5,560,038 | 9/1996 | Haddock | 395/800 |
| 5,568,476 | 10/1996 | Sherer et al. | 370/60 |

METHOD AND INTEGRATED CIRCUIT FOR HIGH-BANDWIDTH NETWORK SERVER INTERFACING TO A LOCAL AREA NETWORK

BACKGROUND OF THE INVENTION

1. Field of the Invention

The invention relates generally to computer interfacing and specifically to local area networks (LANs) with many client workstations that communicate with one or more network servers, such as where the LANs have parallel segments.

2. Description of the Prior Art

Personal computers and engineering workstations are conventionally inter-tied into local area networks (LANs) that allow messages to be sent and programs to be downloaded, e.g., from file servers on the LAN. The ETHERNET, originally a joint effort of Intel, Xerox and Digital Equipment Corporations, is an example of a shared-access LAN now in widespread use. The ETHERNET was originally conceived as a ten megabit per second (Mbps) network that allowed every node on the LAN to transmit and receive. Collisions of data occur when two nodes try to transmit at the same time. Such conflicts are resolved by postponing each's retransmission after a random waiting period.

Many variations in ETHERNET have been subsequently developed. Different kinds of ETHERNET are referred to as "10BASE-T", "10BASE-2", "10BASE-5", "100BASE-VG", and "100BASE-X". Different speeds include ten Mbps, twenty Mbps, one hundred Mbps, and beyond. Different modes of ETHERNET also exist, e.g., conventional half-duplex, and full-duplex ETHERNET switch (FDES). The present invention contributes a new collisionless mode and operational speeds as high as 320 Mbps.

Faster engineering workstations and distributed file systems, such as NFS, LAN MANAGER, and NETWARE, have seriously increased the traffic placed on ordinary LANs. Network congestion results in long processing delays and broken connections. Bridging allows one large LAN to be divided into several parallel segments that are interconnected by a bridge. Intra-segment traffic is conducted in parallel amongst the several segments. It is advantageous therefore to gerrymander the LAN for a minimum amount of inter-segment traffic bridging. The store and forward limitation of such bridging takes time and can cause transmit delays for messages moving from one segment to another. Routers allow individual LANs to be inter-tied. Routers are used with protocols such as ICMP to report inter-network congestion and other anomalous conditions back to end nodes.

Single-chip integrated circuit devices are sold commercially that provide the ETHERNET function in a convenient form that is easy to integrate on to a plug-in LAN adapter board. Such network interface controllers (NICs) make no distinction between the interface of a server and a client. However, servers are typically at the focus of network activity and are often subjected to parallel access requests from clients which have the same data transfer speed limitations as the server itself.

A systems-oriented network interface controller (SONIC) with a twisted pair interface is marketed by National Semiconductor (Santa Clara, Calif.) in a single integrated circuit as the "DP83934 SONIC™-T". The SONIC-T is a second generation ETHERNET controller for sixteen and thirty-two bit system interfacing. A high speed direct memory access (DMA) controller takes five percent of the bus bandwidth and selectable bus mode provide for big-endian and little-endian byte ordering. A linked-list buffer manager permits a range of uses from personal computer (PC) oriented adapters to high-speed motherboard designs. A fully compatible Institute of Electrical and Electronic Engineers (IEEE) standard number 802.3 (IEEE 802.3) encoder/decoder (ENDEC) and a twisted pair interface (TPI) allow a one chip 10BASE-T ETHERNET solution. A National DP8392 coaxial transceiver interface permits the construction of 10BASE2 or 10BASE5 systems. The buffer manager processes receive and transmit packets in the system memory, therefore eliminating intermediate packet copying. The receive buffer manager uses three areas in memory for additional resource allocation, status indication, and packet data buffering. The SONIC-T stores received packets in the buffer area and indicates the receive status and control information in a descriptor area. The transmit buffer manager uses two memory areas, one for status and control indication and the other for fetching packet data.

Conventional SONIC single-chip devices include a TPI, an ENDEC, a media access controller (MAC) unit, separate receive and transmit first-in first-out (FIFO) registers, a system buffer management engine and a user programmable system bus interface unit. Pipelined architectures are used to increase system-level performance. The TPI has five main logic units: a smart squelch, a collision detector, a link detector/generator, a jabber and a transmitter. The smart squelch determines if valid data is present at the inputs. The collision detector checks for simultaneous data transmission and reception on the inputs and outputs. The link detector/generator checks the cable integrity. The jabber prevents the transmitter from outputting too long a packet. The transmitter uses summing resistors and a transformer/filter to output Manchester encoded data. The ENDEC interfaces between either the TPI or the ETHERNET transceiver and the MAC unit. It provides Manchester data encoding and decoding functions for IEEE 802.3 ETHERNET, so called Thin-ETHERNET, or twisted-pair types of LANs. The ENDEC combines non-return to zero (NRZ) data from the MAC unit and clock pulses into Manchester data and sends the data differentially to the transmitter, e.g., in the TPI. During reception, a digital phase locked loop (DPLL) decodes the Manchester data into NRZ-formatted data and into a receive clock. The MAC unit controls media access of transmitting and receiving packets. The MAC unit frames information from a transmit FIFO for transmission and sends serialized data to the ENDEC. The transmit FIFO is arranged as a four-byte wide and eight deep memory array. Incoming information from the ENDEC is de-serialized and frame-checked for validity. Received data is transferred to a receive FIFO. The receive FIFO is also arranged as a four-byte wide and eight deep memory array. Control and status registers are used to manage the MAC unit. The host interface of the SONIC chip has two parts, the control part and the data part. The control part consists of sixty-four addressable registers, an interrupt line, a reset signal, and a chip select line. The data part of the interface uses the DMA transfers between the FIFO's in the SONIC chip and the host memory.

In conventional SONIC devices, a content addressable memory (CAM) is included in the MAC receiver to assist an address recognition unit. A CAM address mismatch causes a packet to be rejected whenever the destination address in the packet does not match an address stored in the CAM. When matches do occur, a de-serializer passes a packet remainder to the receive FIFO. A protocol state machine is included in the MAC transmitter to enforce the carrier sense multiple access with collision detection (CSMA/CD) protocol of the ETHERNET. The carrier sense and collision signals are monitored for network activity. Transmission is deferred if the network is busy. Otherwise, an inter-frame gap timer (9.6 microseconds) times-out and transmission begins. Any network activity detected in the first 6.4 microseconds will restart the timer. Otherwise, network activity is ignored and transmission begins at the end of the current 9.6 microsecond period. If a collision with another transmitter is then detected, a four byte jam pattern of all ones is immediately substituted before terminating the failed transmission. A random number of times slots is inserted as a wait period, where each time slot is 51.2 microseconds. A truncated binary exponential back-off algorithm is used to determine when another transmission should be attempted.

Conventional SONIC single-chip devices provide only one network interface per device, and are "one size fits all", in that the same device is marketed for use by network clients and servers alike. This is especially odd in that many clients on a single segment with a server tend to focus their traffic with the server. Thus more bandwidth is needed on the server link than is required for the client links.

ETHERNET switching is a recent technology that provides for the connection of multiple ETHERNET LANs to a central switch. A telephone private branch exchange (PBX) is conceptually similar. Within the ETHERNET switch, paralleled circuit switching allows the simultaneous transport of multiple packets across the switch. Fast-packet switching improves the throughput by reducing packet buffering, e.g., by reading only the destination address part of an ETHERNET packet. Two ETHERNET switches can be inter-tied by a full-duplex ETHERNET connection "FDES", that allows only one transmitter on each connection, therefore eliminating collisions. Since each connection in each of two directions is able to run at the full ten Mbps, an FDES inter-tie is commonly rated for twenty Mbps. Kalpana, Inc. (Sunnyvale, Calif.) is a pioneer in ETHERNET switching technology, and markets products under the ETHERSWITCH trade name.

However, ETHERNET switching, and other conventional technologies do not address the problem of traffic bottlenecking that can occur on each LAN, or LAN segment, at the network interface controller in a LAN adapter on a server.

In addition to the ten Mbps ETHERNET chips, there are two industry groups working on one hundred Mbps ETHERNET using unshielded twisted pair (UTP) based cabling. One group is known as the "Fast ETHERNET Alliance", and is spearheaded by a company called Grand Junction. Its technology is known as the 100-Base-X which uses two pairs of category-five UTP's and a revamped CSMA/CD protocol. The other group is known as the "100VG-AnyLAN group", and is spearheaded by Hewlett-Packard Corporation. This technology uses four pairs of category-three UTP's to achieve a one hundred Mbps speed. An IEEE committee has sanctioned the technology as the "802.12 standard", and its cabling scheme is referred to as the "100-Base-VG standard". Unfortunately, the one hundred Mbps technology requires an expensive new cable system, has been slow in gaining wide acceptance, and the chip sets are not currently available.

SUMMARY OF THE PRESENT INVENTION

It is therefore an object of the present invention to provide a network interface controller on a single integrated circuit that increases the data bandwidth of a server's connection to a network.

It is a further object of the present invention to provide network interface controller on a single integrated circuit that bridges several LAN segments directly at a server's connection to the LAN.

It is another object of the present invention to provide a collisionless ETHERNET LAN.

It is a further object of the present invention to provide a full-duplex parallel-interface ETHERNET for interconnection of servers and routers.

Briefly, an embodiment of the present invention comprises a single-chip, network interface controller integrated circuit with a host interface and arbiter common to two 10BASE-T segments with respective unshielded twisted pair interfaces, encoder-decoders, medium access controllers, first-in first-out register memory arrays, and buffer management. Source-address and destination-address content addressable memories are connected to respective MAC receivers in the medium access controllers to both learn the addresses of network clients on the two segments and then to transparently bridge packets between the LAN segments.

An advantage of the present invention is that a system is provided that can eliminate a need for a special device driver in the host of a server for inter-segment bridging.

A further advantage of the present invention is that a system is provided that improves the effective bandwidth of a server connection to a local area network.

Another advantage of the present invention is that a method is provided for collisionless ETHERNET communication.

These and other objects and advantages of the present invention will no doubt become obvious to those of ordinary skill in the art after having read the following detailed description of the preferred embodiment that is illustrated in the various drawing figures.

IN THE DRAWINGS

FIG. 7 is a diagram of a packet format for a collisionless inter-NIC device protocol;

DETAILED DESCRIPTION OF THE PREFERRED EMBODIMENTS

Figure 1:
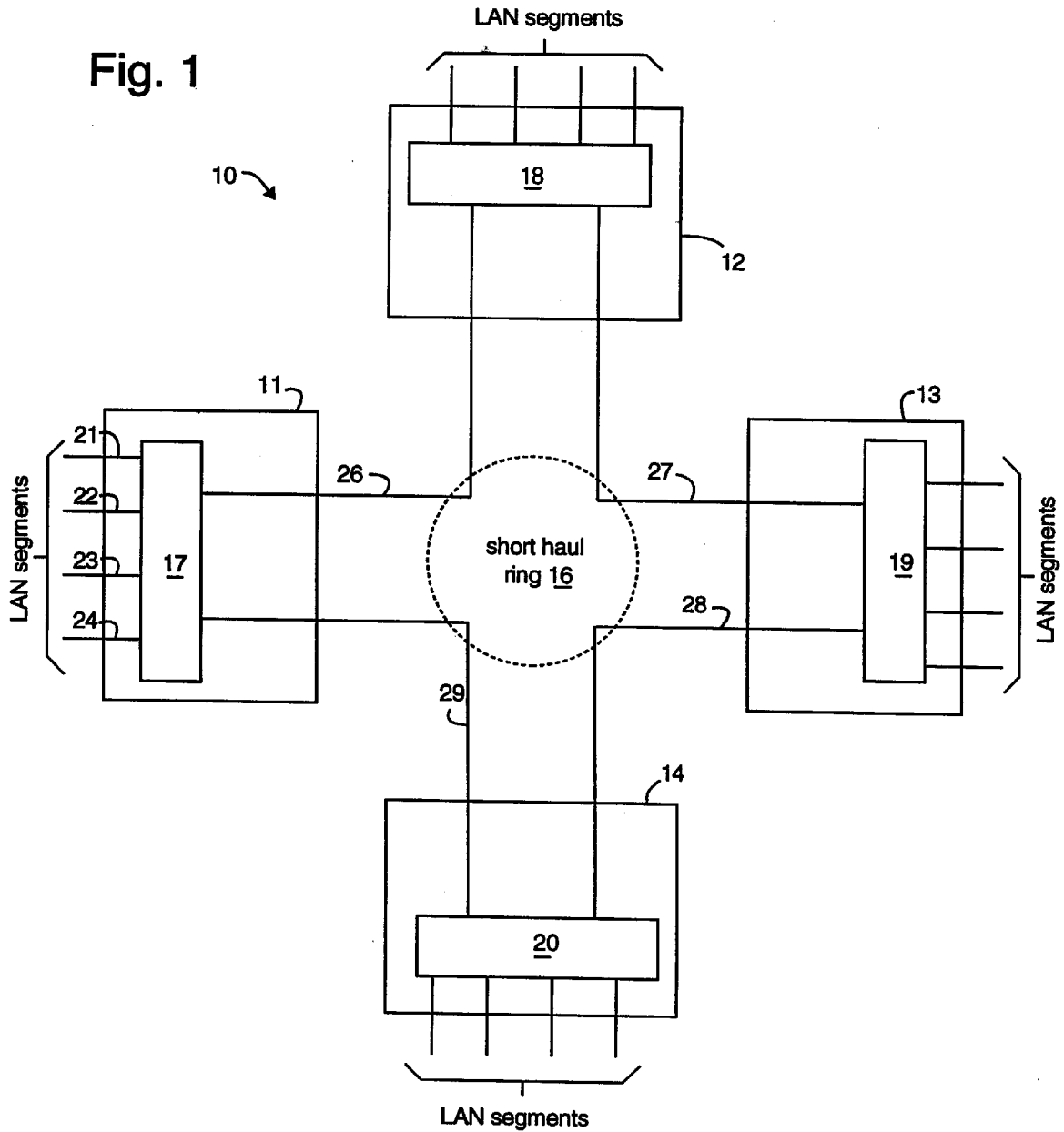
FIG. 1 is a block diagram of network embodiment of the present invention with four file servers that each collect LAN segments and that are inter-tied by a short haul ETHERNET ring.

FIG. 1 illustrates a network embodiment of the present invention referred to herein by the general reference number 10. The network 10 comprises a plurality of file servers 11–14 interconnected into a short-haul ring 16. Each file server 11–14 respectively has a network interface controller (NIC) adapter 17–20.

The file servers 11–14 may be constructed on a basic personal computer (PC) platform, such as the IBM-PC or IBM-compatible, and allow plug-in boards to be added, such as the NIC adapters 17–20, so that file access by network clients is supported to a file storage unit conventionally included in the IBM-PC, e.g., a hard magnetic disk.

Each NIC adapter 17–20 is connected to a plurality of local area network (LAN) segments, e.g., segments 21–24 for NIC adapter 17. Preferably, each LAN segment 21–24 comprises ETHERNET (IEEE 802.3) network interfacing and communication protocol. Each LAN segment 21–24 typically has several workstations and personal computers connected to it that need to exchange and download information and programs. The LAN segments 21–24 together appear to be one logical LAN by virtue of bridge traffic handling by the NIC adapter 17. Bridging delays are kept to a minimum by hardware on each NIC adapter 17–20 that reads the packet destination address and uses a content addressable memory (CAM) to route the packet to the appropriate LAN segment 21–24. The LAN segments connected to the other NIC adapters 18–20 may be organized as additional segments in the same logical LAN connected by NIC adapter 17, or as individual logical LANs that are interconnected by the NIC adapters 17–20 acting as routers, rather than bridges. In one embodiment, all the LANs follow the ETHERNET 802.3 protocol of CSMA/CD.

The short-haul ring 16 includes inter-adapter connections, short-haul links 26–29, which each carry simplex (one transmitter, one receiver) data traffic. All ports labeled "IN" on the NIC adapters 17–20 are connected only to receivers. Similarly, all ports labeled "OUT" on the NIC adapters 17–20 are connected only to transmitters. Collisions are therefore impossible, and all the short-haul links 26–29 can operate at full speed, e.g., three hundred megabits per second (Mbps). Flat-ribbon cables may be used for the short-haul links 26–29. Data transfer is in parallel, thirty-two bits wide, and otherwise resembles ETHERNET communication, e.g., by using the CSMA/CD protocol. When the length of any of the short-haul links 26–29 exceeds six meters, other cabling arrangements are preferable. For example, the conventional full-duplex ETHERNET switch (FDES), as popularized by Kalpana, Inc. (Sunnyvale, Calif.), supports a full ten Mbps data rate.

A switching hub may be constructed by installing several of the NIC adapters 17–20 in a single basic PC platform. A network containing multiple file servers with NIC adapters on the spokes of the hub may be configured with FDES communication on the spokes and an asynchronous transfer mode (ATM) connection to an enterprise network. The switching hub acts a central switching node for the other NIC adapters on the network. Other types of adapters may also be mixed in by the hub, e.g., token ring and FDDI.

Figure 2:
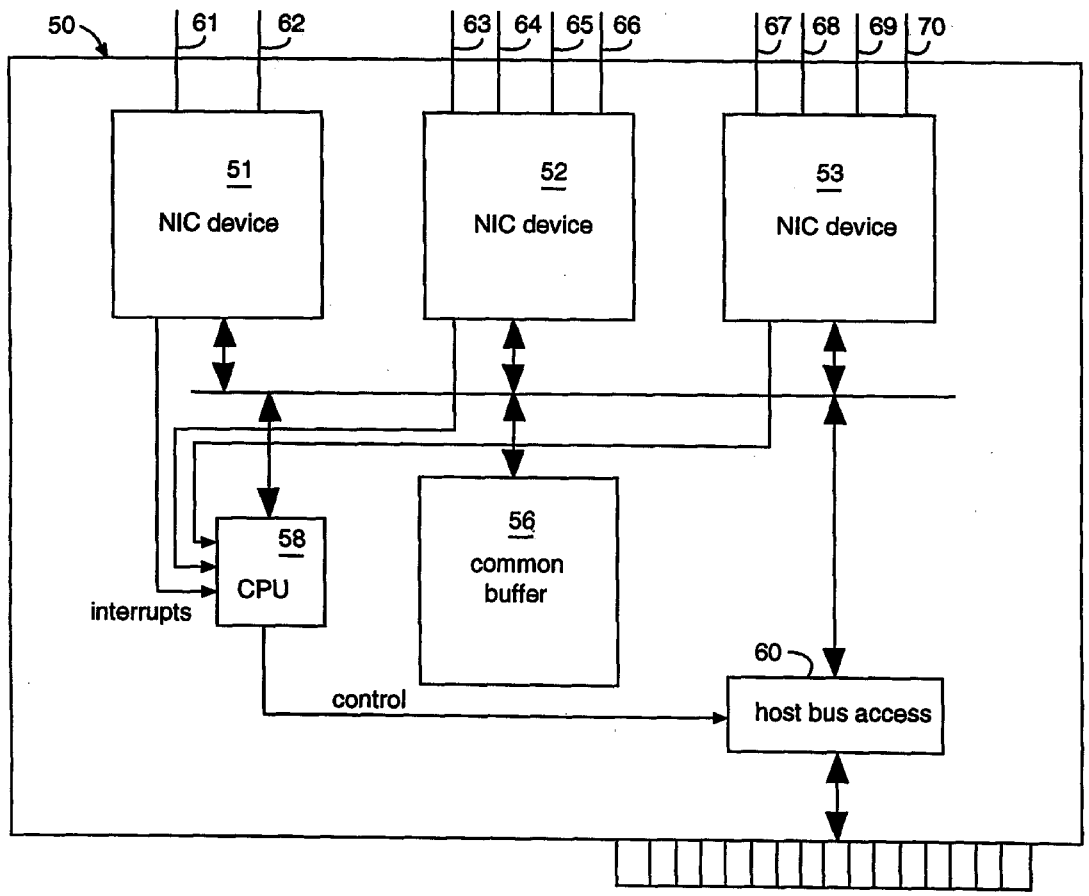
FIG. 2 is a block diagram of one of the network interface controller adapters shown in FIG. 1.

A NIC adapter 50 is illustrated in FIG. 2, and is similar to the NIC adapters 17–20 (FIG. 1). The NIC adapter 50 comprises a set of three different types of NIC semiconductor devices 51–53, each on a single integrated circuit (IC). Each NIC device 51–53 is connected by a bus 54 to a common buffer 56, a processor 58 and a host interface 60. The common buffer 56 and the processor 58 relieve a host of running a special device driver and permit local management and isochronism. Alternatively, the common buffer 56 and the processor 58 can be replaced by a simple bus coordinator to arbitrate access to and from the host interface 60.

Preferably, the NIC adapter 50 is configured as an extended industry standard architecture (EISA) plug-in board for the IBM-PC. Alternatively, the NIC adapter 50 is configured as a Peripheral Component Interconnect (PCI) plug-in board. There are a pair of LAN connections 61 and 62 for external connection of network segments to two respective transceivers in the NIC device 51. There are a set of four LAN connections 63–66 for external connection of network segments to four respective transceivers in the NIC device 52. There are a also a set of four LAN connections 67–70 for external connection of network segments to four respective transceivers in the NIC device 53.

The NIC devices 51–53 may all be interfaced to the same kind and same speed networks all operating in the same mode, or the networks may be different in kind, speed or mode. Examples of different "kinds" of ETHERNET, are 10BASE-T, 10BASE-2, 10BASE-5, 100-Base-VG, or 100-Base-X. Examples of different "speeds" of ETHERNET, are ten Mbps, twenty Mbps, and one hundred Mbps, or 320 Mbps as in the short-haul ring 16. Examples of different "modes" of ETHERNET, are the conventional half-duplex and full-duplex FDES, and a collisionless-mode, introduced herein.

The NIC devices 51–53 are preferably fabricated with any combination of ETHERNET transceivers, e.g., four 10BASE-T transceivers, two FDES transceivers and two 10BASE-T transceivers with collisionless mode, or two short-haul parallel transceivers to support the short-haul ring 16, etc.

The ten parallel LAN connections 61–70 are connectable to respective physically separated LAN segments, which can appear as a single logical LAN to applications software in all server and client workstations connected to any of the segments. Such a single logical LAN allows any server or client entity on the LAN to communicate directly to any other entity on the same LAN. A packet bridging mechanism is used in the MAC unit to establish the logical connection of the separated LAN segments.

Figure 3:
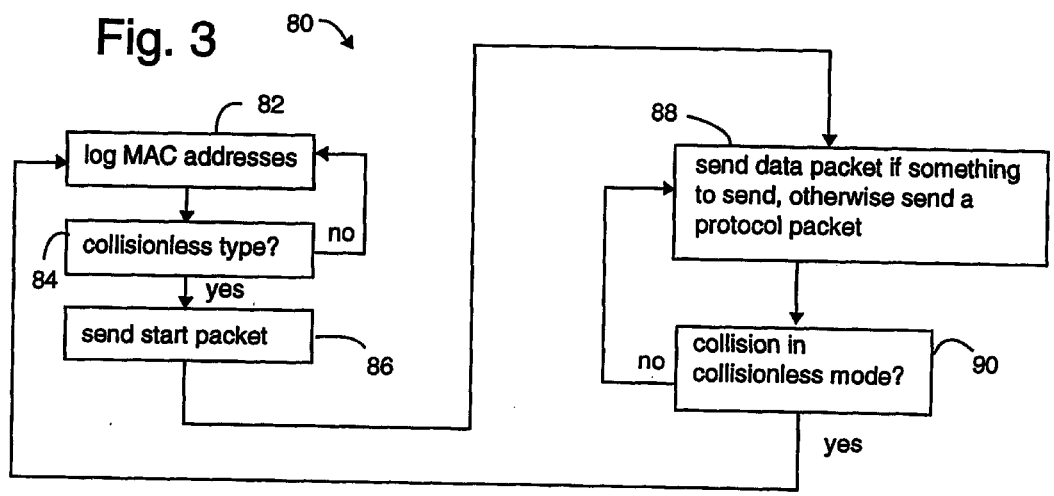
FIG. 3 is a flow chart for a computer-implemented method embodiment of the present invention for improving data throughput in a local area network that uses a carrier sense multiple access with collision detection protocol.

The NIC devices 51–53 preferably include a computer-implemented method 80, shown in FIG. 3, of improving data throughput in a local area network (LAN) that uses a carrier sense multiple access with collision detection (CSMA/CD) protocol. The throughput is improved by avoiding collisions through a mechanism of scheduling packet transmissions that is agreed to by all nodes on a LAN. The method 80 comprises a step 82 for logging a medium access controller (MAC) address for each of a plurality of network interface controllers (NICs) communicating packets on a LAN segment subject to packet collisions. A step 84 determines whether all the NICs are of a type that can support a collisionless packet exchange mode, and if not, returning to the step of logging, otherwise entering a collisionless packet mode. A step 86 transmits a start packet by an NIC with a lowest MAC address, wherein a transmission schedule is initiated. In a step 88, either a data packet or a protocol packet is transmitted in a sequence slot in the transmission schedule in a round-robin, according to the MAC address of a corresponding NIC. The method 80 alternatively further comprises a step 90 that determines whether a collision has occurred in the collisionless mode. And, if a collision has occurred, control returns to the step 82 of logging packets passing by.

The commercially-available SONIC-T chip can be modified for such a collisionless mode of operation. Essentially, the packet transmitter is inhibited when an internal "collisionless op" bit is active, e.g., see FIG. 6. Such inhibit on the transmitter is removed only after the reception of a packet whose source address matches with the address stored in a special address register. When a match is detected, the transmitter is permitted to transmit one packet. The source address of every incoming packet is compared with the content of the special address register. If a match is found, and if it is in the "collisionless op" mode, the packet in the transmit buffer is gated to the transmitter. When not in the "collisionless op" mode, the transmitter is not inhibited by the source address comparator.

An additional feature can be built into the Sonic-T chip that will provide more convenience to the driver software. This feature gives the responsibility of transmitting a protocol packet to the modified Sonic-T chip when there is no data packet available for transmission.

This can be accomplished in one of the two ways, by storing the content of the protocol packet in the modified SONIC-T itself, or by providing an additional set of transmission registers in the modified SONIC-T chip that point to the location of the protocol packet in the transmit buffer, and the length of the protocol packet.

Figure 4:
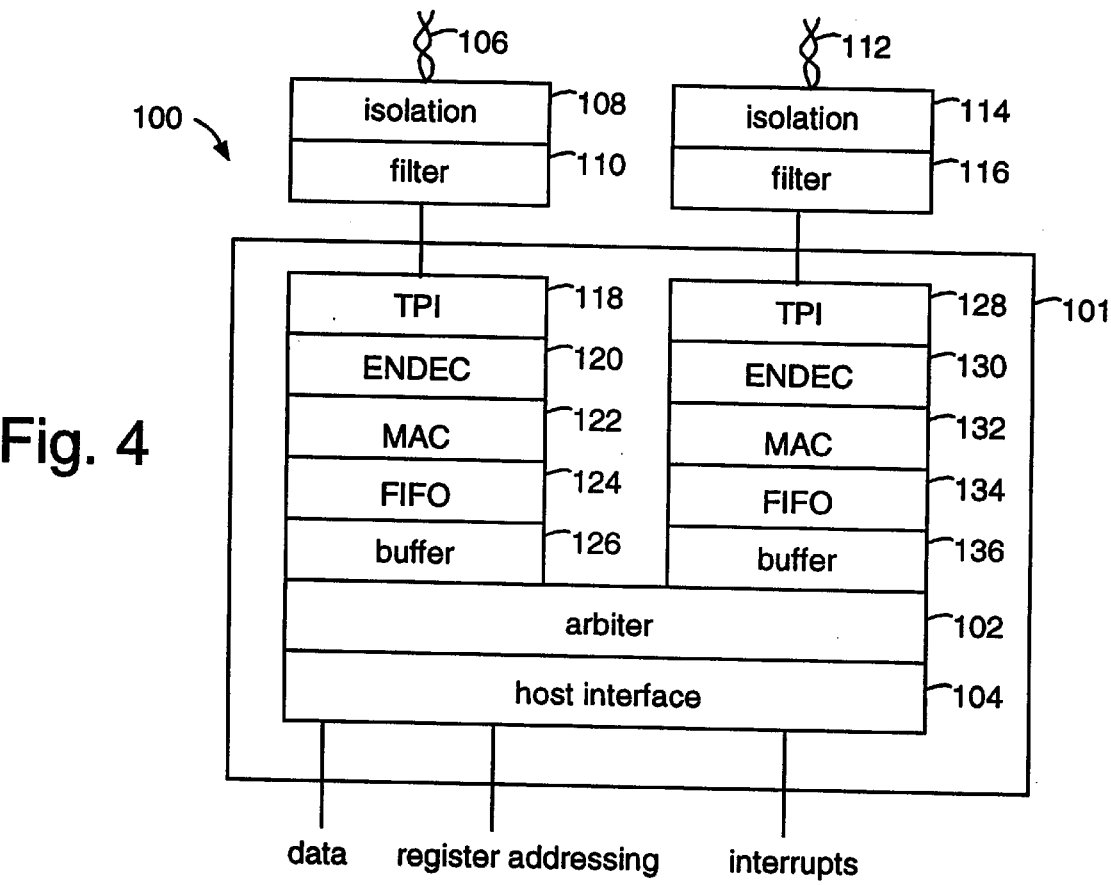
FIG. 4 is a block diagram of the two-transceiver NIC device shown in FIG. 2.

FIG. 4 illustrates a NIC device 100 which is similar to the NIC device 51 (FIG. 2). The NIC device 100 is a single-chip implementation of two ETHERNET controllers on a single semiconductor chip substrate 101, and which share an arbiter 102 and a host interface 104. The arbiter resolves bus access conflicts to and from the host interface 104 between the two ETHERNET transceiver channels. A LAN connection 106 interfaces a LAN segment to a first ETHERNET transceiver channel having an isolation unit 108 and a filter 110. A LAN connection 112 interfaces another LAN segment to a second ETHERNET transceiver channel having an isolation unit 114 and a filter 116. Such LAN segments may comprises several workstations and personal computers, all with conventional, single-transceiver channel ETHERNET network interface controllers. The first ETHERNET transceiver channel includes a twisted pair interface (TPI) 118, an encoder-decoder (ENDEC) 120, a media access controller (MAC) unit 124, a FIFO array and FIFO manager 124 and a buffer manager 126. The second ETHERNET transceiver channel includes a twisted pair interface (TPI) 128, an encoder-decoder (ENDEC) 130, a media access controller (MAC) unit 134, a FIFO array and FIFO manager 134 and a buffer manager 136.

The TPI's 118 and 128 perform electrical functions required to use an unshielded twisted pair (UTP) cabling system. The ENDEC's 120 and 130 convert Manchester code to and from NRZ code in compliance with the IEEE 802.3 standards. On packet reception, ENDEC's 120 and 130 extract timing signals from incoming packets with a digital phase lock loop (DPLL), and they also detect collisions. The MAC units 122 and 132 enforce the packet integrity of the ETHERNET frame. Each contains a MAC receiver and a MAC transmitter. The MAC receivers are substantially different from conventional NIC chips with single ETHERNET transceiver channels. The MAC receivers in the MAC units 122 and 132 check the integrity of incoming packets, and respectively match their destination addresses against a list of pre-loaded addresses in an associated content addressable memory (CAM). If a match occurs, the packet is loaded into a receive FIFO and from there to the host system. Both the source address and the destination address of incoming packet are important in the operation of the NIC device 100. The FIFO array and FIFO managers 124 and 134 make sure that data is not lost during packet transfer between the host and the LAN. The buffer managers 126 and 136 use second generation buffering techniques, e.g., linked lists. The host interface 104 has two parts, a control part and a data part. The control part consists of addressable registers, interrupt lines, a reset signal, and a chip select line. The data part of the interface uses DMA transfers between the FIFO arrays 124 and 134 and the host memory.

Figure 5:
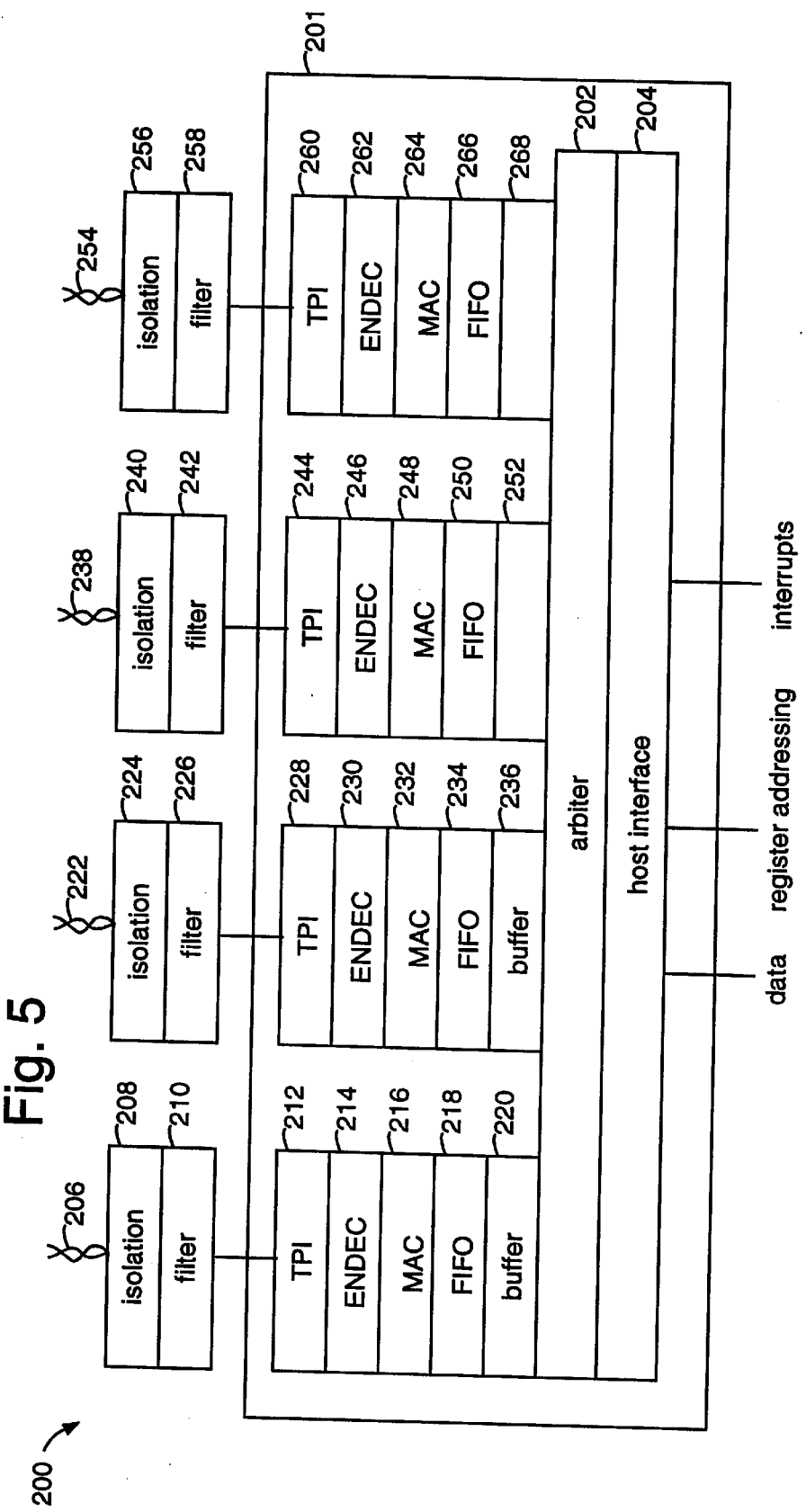
FIG. 5 is a block diagram of one four-transceiver NIC device shown in FIG. 2.

FIG. 5 illustrates a NIC device 200 which is similar to the NIC devices 52 and 53 (FIG. 2). The NIC device 200 is a single-chip implementation of four ETHERNET controllers on a single semiconductor chip substrate 201, and which share an arbiter 202 and a host interface 204. In one embodiment, the NIC device 200 is similar to the NIC device 100, albeit with twice as many ETHERNET transceiver channels. The present invention is not limited to having all the same types, same speeds and same modes of network interface controllers on the NIC device 200. In some applications, it will be advantageous to have a heterogeneous mix. The arbiter 202 resolves bus access conflicts to and from the host interface 204 between the four ETHERNET transceiver channels. A LAN connection 206 interfaces a first LAN segment to a first ETHERNET transceiver channel having an isolation unit 208 and a filter 210. The first ETHERNET transceiver channel includes a first twisted pair interface (TPI) 212, a first encoder-decoder (ENDEC) 214, a first media access controller (MAC) unit 216, a first FIFO array and first FIFO manager 218 and a first buffer manager 220. A LAN connection 222 interfaces a second LAN segment to a second ETHERNET transceiver channel having an isolation unit 224 and a filter 226. The second ETHERNET transceiver channel includes a second twisted pair interface (TPI) 228, a second encoder-decoder (ENDEC) 230, a second media access controller (MAC) unit 232, a second FIFO array and second FIFO manager 234 and a second buffer manager 236. A LAN connection 238 interfaces a third LAN segment to a third ETHERNET transceiver channel having an isolation unit 240 and a filter 242. The third ETHERNET transceiver channel includes a third twisted pair interface (TPI) 244, a third encoder-decoder (ENDEC) 246, a third media access controller (MAC) unit 248, a third FIFO array and third FIFO manager 250 and a third buffer manager 252. A LAN connection 254 interfaces a fourth LAN segment to a fourth ETHERNET transceiver channel having an isolation unit 256 and a filter 258. The fourth ETHERNET transceiver channel includes a fourth twisted pair interface (TPI) 260, a fourth encoder-decoder (ENDEC) 262, a fourth media access controller (MAC) unit 264, a fourth FIFO array and fourth FIFO manager 266 and a fourth buffer manager 268.

Figure 6:
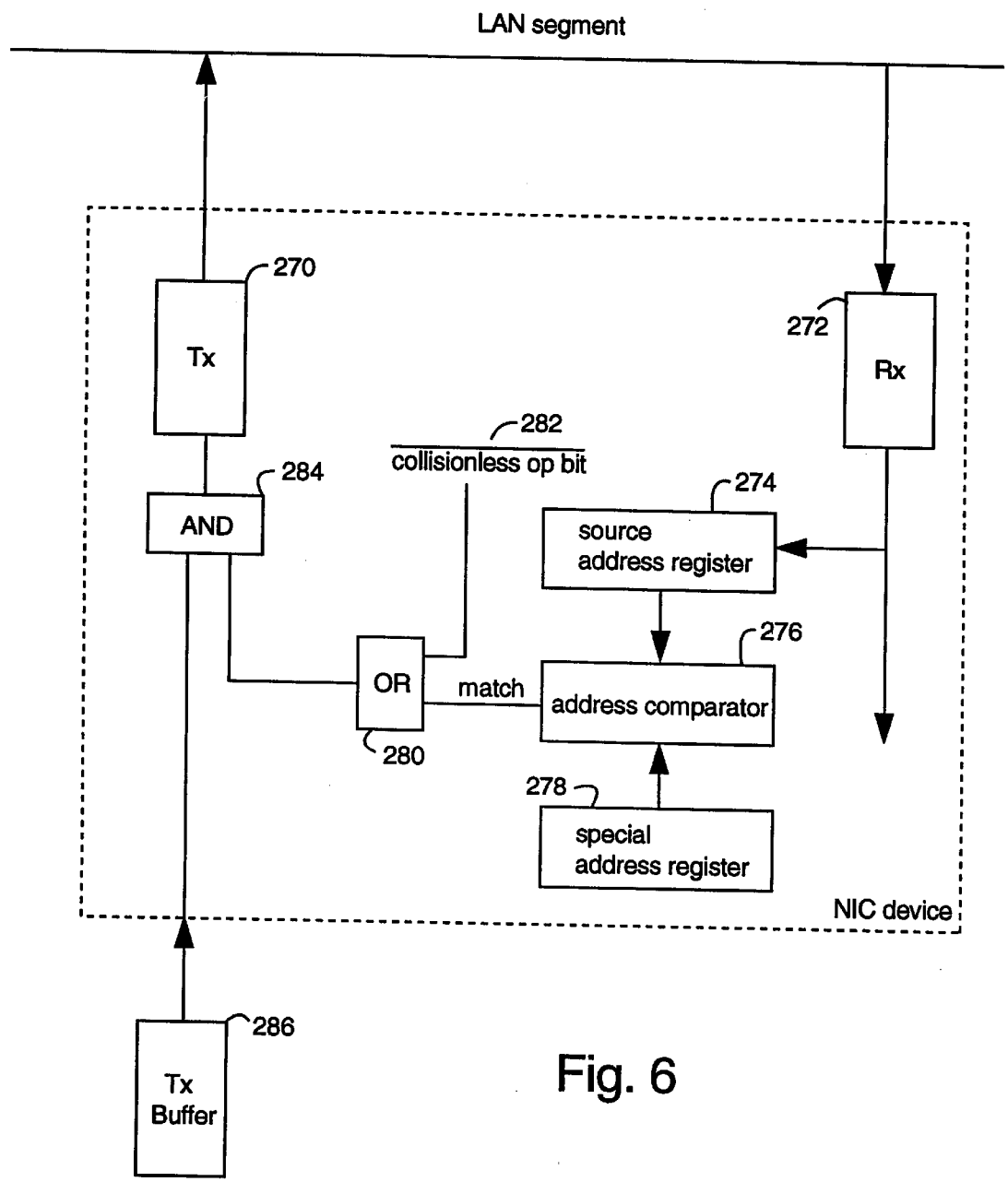
FIG. 6 is a block diagram of a collisionless mode implementation for the NIC devices of FIGS. 4 and 5.

FIG. 6 illustrates a collisionless mode implementation for the NIC devices 100 and 200. Within the MAC units 122, 132, 216, 232, 248 and 264, there is a packet transmitter 270 and a packet receiver 272. A packet source address register 274 stores the source address of a packet received by the packet receiver 272 and is connected to an address comparator 276. An address stored in a special address register 278 is compared with the currently received source address. If a match occurs, an OR-gate 280 with a "negation of the collisionless op-bit" signal input 282 is used to control the packet transmitter 270 through an AND-gate 284. The AND-gate allows data in a transmit buffer 286, e.g., in FIFO 124, 218, to be sent out. The packet transmitter 270 is inhibited when the internal collisionless op bit input 282 is active. The inhibit on packet transmitter 270 is removed only after the reception of a packet whose source address matches with the address stored in a special address register 278. When a match is detected, packet transmitter 270 is permitted to transmit one packet. The source address of every incoming packet is compared with the content of the special address register 278. If a match is found, and if the "collisionless op" mode is active, the packet in the transmit buffer 286 is gated to packet transmitter 270. When not in the "collisionless op" mode, packet transmitter 270 is not inhibited by the source address comparator 276.

FIG. 7 shows a packet format 300 for a collisionless inter-NIC device protocol. The packet format 300 includes a destination address field 302 of six bytes, a source address field 304 of six bytes, a type field 306 of two-bytes, a command field 310 of two bytes, a data field 312 of variable length, and a cyclic redundancy check (CRC) field 314 of four bytes.

Figure 8:
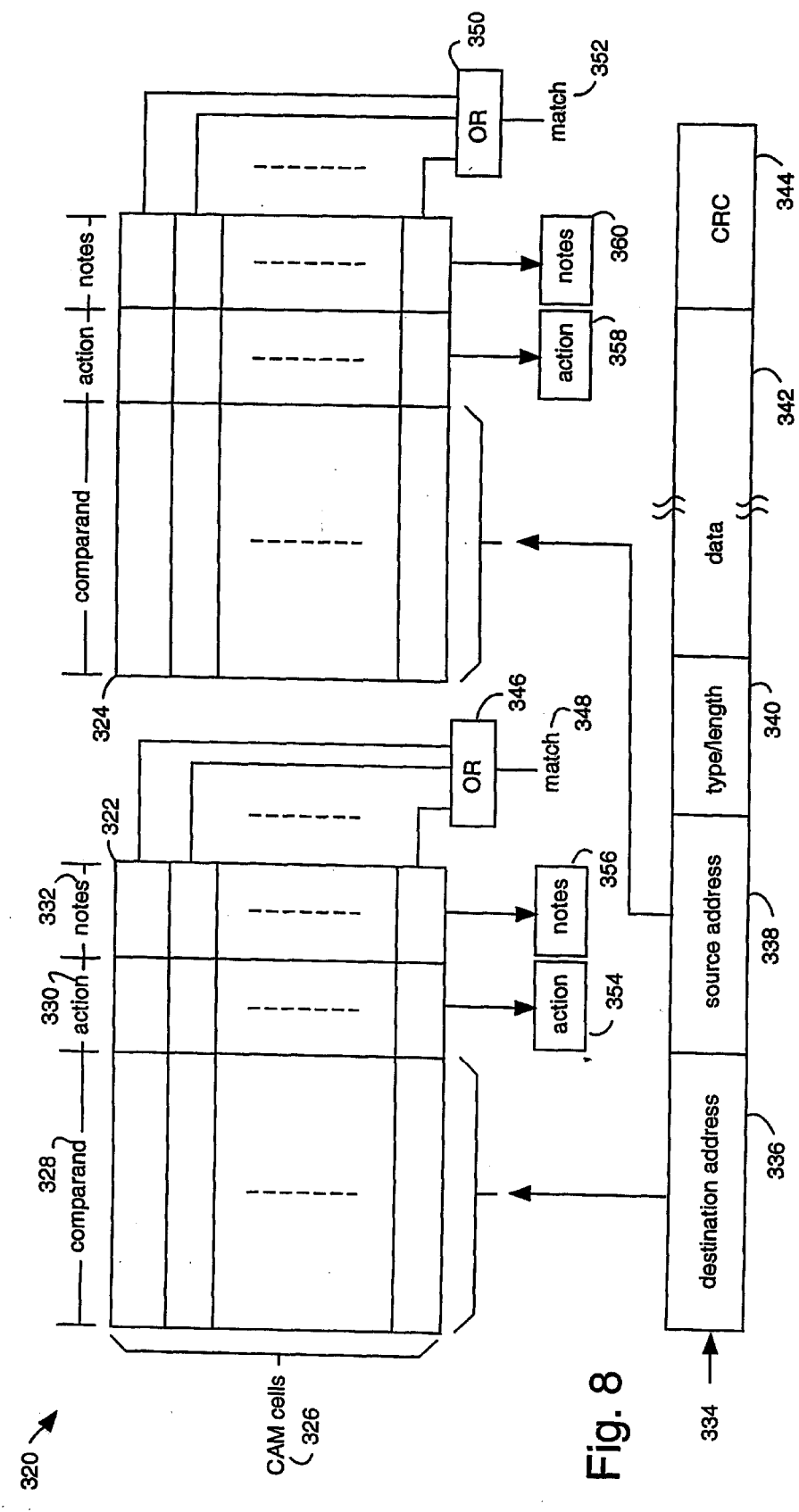
FIG. 8 is a block diagram of an address comparison unit which includes a pair of content addressable memories.

In the general case for an ETHERNET packet, e.g., packet 334 in FIG. 8, the destination and source addresses are routing information. If the destination is not on the same LAN segment as the source, the NIC devices 100 and 200 are configured to bridge the packet received by one MAC receiver in MAC units 122, 132, 216, 232, 248 and 264 to a MAC transmitter in one of the MAC units that corresponds to the LAN segment which has the destination address. If the network clients destination and source are not on two LAN segments connected to the same NIC device, e.g., NIC device 51 (FIG. 2), the packet must be bridged between NIC devices by an external mechanism. Such a function is preferably transparently-performed by the processor 58 (FIG. 2) which is alerted by an interrupt signal. Such transparent action refers to the main host processor, off of the NIC adapter board.

Referring to FIG. 2 as an example, if a packet on LAN segment 61 which is connected to NIC device 51 receives a packet with a destination address that indicates it should be bridged to LAN segment 63, an interrupt is generated by NIC device 51 to processor 58. The packet is then moved to the common buffer 56. The processor 58 then writes the packet from the common buffer 56 to the NIC device 52, for transmission by its MAC transmitter out on LAN segment 63. In the case of packets received by one NIC adapter 50 for LAN segments connected to another NIC adapter 50, the host processor common to both NIC adapters does the packet transfer between adapters. For example, in an IBM-PC where the NIC adapters are configured as individual plug-in boards for the ISA bus, the PC's main processor is used to communicate the packet for bridging over the ISA bus.

In order to reduce the bridging delays to a minimum, the fact that the destination address is at the front of a packet is preferably used to begin the packet bridging before the whole of the packet is received. In such a case, bridging delays can be reduced to as little as thirty microseconds, on an intra-NIC device basis.

For the collisionless inter-NIC packet, e.g., packet 300 in FIG. 7, a unique number such as ABCDH, is placed in the type field 306 for identification. The length field 308 specifies the total number of bytes in the command field 310 and the data field 312. The number in the length field 308 does not include the four-bytes in the CRC field 314. A NIC device sender on a LAN segment places a MAC address unique to it in the destination field 302, and places a synthesized group address in the source field 304. This destination address is formed by setting the most significant bit of the address to ONE in the sender's address, so the least amount of confusion is caused in any workstations with conventional network interface controllers on the LAN segment.

Sixty-four thousand different commands are possible using two bytes for the command field 310. At a minimum, the present invention includes the use of the command codes in the following tables. The assignment of a number as a code is arbitrary, and any number that fits in the command field would serve as well. Whatever the actual code numbers that are used, all the participants must agree on what each code signifies.

Self Advertising packet:
Command code = 0000h
Data (server-or-client) = topological ID
This packet is used to identify an NIC device at power-on, and to solicit others for the same type of packet on the network.

Start (short) packet:
Command code = 0001h
Data = none
This packet is used to start a cooperative transmission schedule to implement a collisionless segment.
Start (long) packet:
Command code = 0002h
Data = MAC address list of transmitters
This packet is also used to start a cooperative transmission schedule, but it carries a list of transmitters in the packet.
Stop packet:
Command code 0003h
Data = reason-to-stop
This packet stops an existing collisionless schedule.
Configuration update packet:
Command code = 0004h
Data = segment number (client, servers),
Ring-in(server),
Ring-out (server)
This packet provides a periodic update of the current configuration of the local NIC device.
Envelope packet:
Command code = 0005h
Data = enclosed forwarding user packet
This packet lets one NIC to address another NIC device in an envelope containing a user packet to be forwarded to its destination.
Spanning Tree discovery packet:
Command code = 0006h
Data = root election and tree configuration
This packet is used to discover the root and the tree configuration.

FIG. 8 shows an address comparison unit 320, which includes a pair of content addressable memories (CAMs) 322 and 324, each of which have a plurality of CAM cells, shown as rows 326 which are divided into columns for a comparand field 328, an action field 330 and a notes field 332. A data packet 334, which is identical to or similar to packet 300 (FIG. 7), is received in a corresponding MAC unit receiver and includes a destination address field 336, a source address field 338, a type and length code field 340, a data field 342 and a CRC field 344. The destination address field 336 is simultaneously compared to all the comparand fields 328 in the CAM cells 326 of the CAM 322. If the data in any match, an OR-gate 346 gates out a match signal 348. The source address field 338 is also simultaneously compared to all the comparand fields 328 in the CAM cells 326 of the CAM 324. If the data in any of the comparand fields match, an OR-gate 350 gates out a match signal 352. An action register 354 receives data from the action field 330 of the CAM 322. A notes register 356 receives data from the notes field 332 of the CAM 322. An action register 358 receives data from the action field 330 of the CAM 324. And a notes register 360 receives data from the notes field 332 of the CAM 324.

When a match occurs, the associated action field 330 and the notes field 332 are copied to respective holding registers 354–360. The bits in the action registers 354 and 358 are structured into groups of bits. The following table shows an exemplary assignment of bits in the Action register.

| Bit | Action |
| --- | --- |
| 0 | accept packet |
| 1 | reject packet |
| 2 | activate interrupt |
| 3–6 | interrupt number |
| 7 | increment counter |
| 8 | decrement counter |
| 9–12 | counter number |
| 13 | activate transmitter for collisionless scheduling |
| 14 | accept if addresses match |
| 15 | load packet to the alternate buffer |

The assignments of bits in the two action registers 354 and 358 are independent. For example, bit 13 is applicable to the source address 338 only. It is a software alternative implementation of the hardware for collisionless operation shown in FIG. 6. The meanings attached to data in the notes field 332 is programmable by the software. These bits can provide filter information about a received packet. The notes field 332 is preferably read by software as a part of status information related to a received packet.

The address comparison unit 320 uses CAMs 322 and 324 to relieve the software from much of the overhead associated with bridging packets between LAN segments. The CAMs 322 and 324 make it possible to quickly reject packets for bridging operations that are intended for workstations on the same LAN segment, and to tag packets which will need bridge processing. The software may also specify an action if there is no match. Additional features such as directed interrupts, packet counting, and alternate buffering, are also helpful to expedite the task of packet bridging.

The CAMs 322 and 324 can effectively be taught important aspects of their LAN environment. Preferably, software issues a learn command to the NIC devices 100 and 200, along with data for action field 330 for the source address CAM 324, data for the notes field 332 for the source address CAM 324, data for the action field 330 for the destination address CAM 322, data for the notes field 332 for the destination address CAM 322, and a limit "n" of learning cycles before termination The NIC device hardware executes the learn command by receiving a packet, comparing the packet's source address against the contents of the source address CAM 324, if a match occurs, learning is not required so the normal operation is performed and exits. But if there is no match, the source address of the packet is loaded into both CAMs 322 and 324, along with the action fields 330 and the notes fields 332 with data provided by the software. A learning cycle counter is incremented, a check is made of the learning cycle counter to the limit "n", the learning mode is terminated if the limit is reached. The learn mode is used primarily to recognize any workstations on a LAN segment, and it has the effect of rejecting packets intended for other workstations on the segment.

Figure 9:
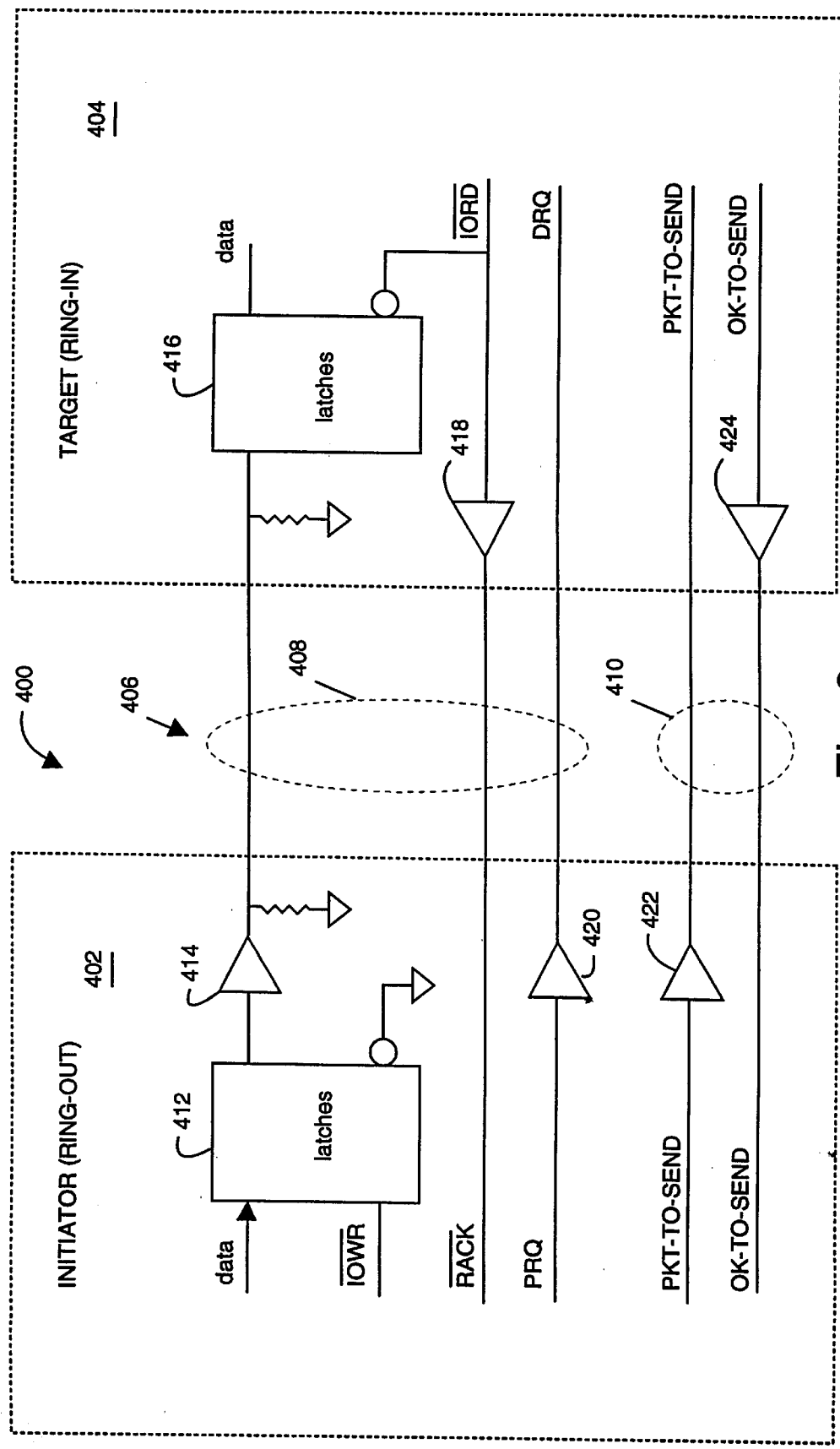
FIG. 9 is a schematic diagram of an interface circuit for the short haul ring shown in FIG. 1.

FIG. 9 is a schematic diagram of an interface circuit 400 for the short-haul ring 16 shown in FIG. 1. An initiator 402 is connected to a target 404 with a flat ribbon cable 406 having a data portion 408 and a control portion 410. For example, referring to FIG. 1, the initiator can comprise the OUT port of NIC adapter 17 and the target can comprise the IN port of NIC adapter 18. The communication over the cable 406 is CSMA/CD ETHERNET, but simplex (one-way only), and in parallel, e.g., thirty-two bits at a time. The objective is to use ETHERNET transceivers for data communication that are tapped in the MAC unit serializer to provide a parallel output and tapped in the MAC unit de-serializer to provide a matching parallel input. Manchester encoding and decoding, together with NRZ formatted data and clock are therefore unnecessary and not used. Packets requiring more than thirty-two bits are transferred in two or more parallel transmissions. Data is input to a set of thirty-two latches 412 and output with a set of thirty-two line drivers 414. The parallel data transfers over the flat ribbon cable 408 to a set of thirty-two receiving latches 416. A read control signal (IORD) is used to control the read latches 416 and is buffered by a line driver 418 to the initiator 402 as a read acknowledge (RACK). A packet request (PRQ) is buffered by a line driver 420 and is received by the target 404 as a data request (DRQ). In the control portion 410, a packet-to-send signal in the initiator 402 is buffered by a line driver 422. An OK-to-send signal in the target 404 is buffered by a line driver 424.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A file server for connection to and servicing of a plurality of network clients distributed over a plurality of local area network segments and for bridging packets amongst all said network clients to establish a unified local area network, comprising:

a plurality of connections to said plurality of local area network segments;

a plurality of local area network transceivers in a single network interface controller (NIC) adaptor with corresponding interfaces to the plurality of connections, wherein each local area network segment is associated with one local area network transceiver, and wherein each local area network transceiver is coupled to a communication bus within said NIC adaptor;

a host interface coupled to said communication bus for providing access to a host; and address comparison means coupled to the local area network transceivers for reading packet destination and source addresses and learning and packet filtering means for bridging said packets between said local area network segments according to said destination and source addresses after learning which network clients are resident on which segments wherein packets for communication between transceivers of said NIC adaptor are bridged over the communication bus and packets for communication with the host are communicated over said host interface.

2. The file server of claim 1, wherein:

the local area network transceivers include means for carrier sense multiple access with collision detection (CSMA/CD) protocol.

3. The file server of claim 1, wherein:

the address comparison means includes a content addressable memory (CAM) connected to receive the destination addresses included in said packets for initiating bridging before an entire packet is received.

4. An apparatus for connection to and servicing of a plurality of network clients distributed over a plurality of local area network segments and for bridging packets amongst all said network clients to establish a unified local area network, comprising:

a plurality of connections to said plurality of local area network segments;

a first local area network transceiver in a first network interface controller (NIC) device with a corresponding interface to one of the plurality of connections;

a plurality of local area network transceivers in a second NIC device with corresponding interfaces to the plurality of connections, wherein each local area network segment is associated with one local area network transceiver, and wherein said first NIC device and said second NIC device are coupled to a communication bus;

address comparison means coupled to said first NIC device and to said second NIC device for reading packet destination and source addresses and learning and packet filtering means for bridging said packets between said local area network segments according to said destination and source addresses after learning which network clients are resident on which segments wherein packets for communication between transceivers of said second NIC device are bridged within said second NIC device and wherein packets for communication between said first transceiver of said first NIC device and a transceiver of said second NIC device are bridged over said communication bus; and a host interface coupled to the communication bus wherein packets for communication with a host are communicated over said host interface.

5. The apparatus of claim 4, wherein:

the local area network transceivers include means for carrier sense multiple access with collision detection (CSMA/CD) protocol.

6. The file server of claim 4, wherein:

the address comparison means includes a content addressable memory (CAM) connected to receive a destination address from a receiver in one of said media access controllers for initiating bridging before an entire packet is received.

* * * * *